Figure 1:
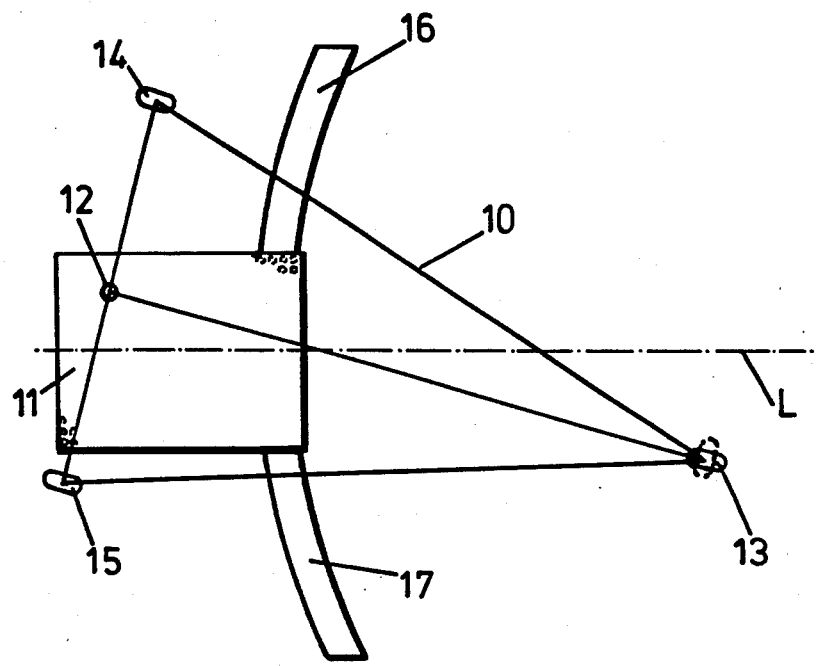

United States Patent [19]
Craig

[11] Patent Number: 4,787,574
[45] Date of Patent: Nov. 29, 1988

[54] AIRCRAFT HANDLING SYSTEMS ON SHIPS

[75] Inventor: Thomas M. Craig, Loanhead, Scotland

[73] Assignee: Mactaggart, Scott (Holdings) Limited, Loanhead, Scotland

[21] Appl. No.: 874,945

[22] Filed: Jun. 16, 1986

[30] Foreign Application Priority Data

Jun. 20, 1985 [GB] United Kingdom ............... 8515708

[51] Int. Cl.$^4$ .................................................. B64F 1/24
[52] U.S. Cl. ...................................................... 244/116
[58] Field of Search ............................... 244/115, 116

[56] References Cited

U.S. PATENT DOCUMENTS

| | | | |
|---|---|---|---|
| 3,790,111 | 2/1974 | Mesnet et al. | 244/116 |
| 4,319,722 | 3/1982 | Pesando | 244/116 |
| 4,529,152 | 7/1985 | Bernard | 244/116 |

Primary Examiner—Galen Barefoot
Assistant Examiner—Rodney Corl

[57] ABSTRACT

This invention relates to apparatus for positioning aircraft, the apparatus comprising a launching grid (11) into which a harpoon (12) or the like of an aircraft can be located. The launching grid (11) has an associated lateral adjustable alignment means (16, 17) onto which the main wheels (14, 15) of the aircraft can be located. The aligning means (16, 17) can then be adjusted to move the main wheels of the aircraft into a desired position.

7 Claims, 3 Drawing Sheets

AIRCRAFT HANDLING SYSTEMS ON SHIPS

This invention relates to apparatus for controlling the movement of aircraft or the like on for example the deck of a ship or on a landing platform on an oil rig. The invention has particular, but not exclusive, application to helicopters.

In a previously proposed system for controlling the movement of a helicopter or helicopters on the deck of a ship, there is provided a perforated landing grid on which the helicopter lands. On landing, a hydraulically operated, retractable probe or harpoon is extended from the helicopter to engage the perforations of the grid in order to restrict the movement of the aircraft. It is generally then required to move the helicopter from the grid into a hangar on the deck and this is commonly accomplished by connecting wires to the aircraft from three hydraulic winches. One forward winch is located in the hangar and the other two winches are located aft and are arranged to apply a tension from the port and starboard sides of the ship. On release of the harpoon from the landing grid, the three winches are controlled to pull the aircraft into the hangar. During such movement, the two aft winches provide a back tension and tend to prevent lateral sliding or toppling over of the aircraft. The aforesaid three-winch system has been found to be effective in normal operating conditions. It has, however, limitations in very adverse weather conditions where rough sea states are prevalent. In such adverse conditions, the three-winch system is not sufficient to prevent lateral sliding or toppling of an aircraft as it is being moved from the landing grid to its hangar. Such sliding and toppling can result in damage to or even loss of the aircraft.

In order to prevent sliding or toppling of an aircraft in such adverse conditions as it is moved from a landing grid to a hangar, various arrangements have been proposed. In one previously proposed arrangement, the aircraft is moved from landing grid to hangar by means of the above described three-winch system and during such movement is controlled by the application of laterally extending restraining wires. Such restraining tires continuously apply a lateral tension to the aircraft.

In a second previously proposed arrangement, low-profile deck-mounted rails extend between the landing grid and the hangar. Tractor units in the form of trolleys or shuttles are provided on the rails and are adapted to engage the nose wheel and the main wheels of an aircraft. The trolleys are then driven along the rails to move the aircraft into the hangar, the aircraft being supported against lateral sliding or toppling by means of the rails and their associated trolleys.

When such fixed rails are utilised as described above, it is necessary for the aircraft after landing on the grid to be suitably aligned and positioned relative to the rail-guided tractor system for movement along an intended path of travel. This adjustment is termed "centering" of the aircraft.

An object of the present invention is to provide means whereby centering of an aircraft can be achieved in a simple and effective manner.

According to the present invention there is provided apparatus for positioning an aircraft, said apparatus comprising an aircraft landing grid on which an aircraft can be engaged for rotation about a harpoon of the aircraft characterised in that there is provided laterally adjustable aligning means associated with the landing grid, said aligning means being adapted to receive spaced main wheels of an aircraft on movement thereof from the landing grid and being movable laterally to position said main wheels at a desired location on either side of an intended path of travel of the aircraft.

Preferably, the aligning element is in the form of an arcuate beam.

Preferably also, the aligning element is disposed relative to the landing grid and a rail-guide aircraft handling system whereby an aircraft can be moved from a first position on the landing grid to a second position remote from said landing grid.

According to a further aspect of the present invention, there is provided a method of positioning an aircraft having a pair of spaced main wheels comprising engaging an aircraft on a landing grid by means of a harpoon or the like and rotating the nose of the aircraft onto a line constituting the intended path of travel of the aircraft from the landing grid characterised in that after release of the harpoon or the like, the nose of the aircraft is moved away from the landing grid along the line of intended path of travel to position the spaced main wheels of the aircraft on laterally adjustable aligning means associated with the landing grid and effecting lateral adjustment of said aligning means to position the spaced main wheels at a desired location on either side of said line of intended path of travel.

Figure 2:
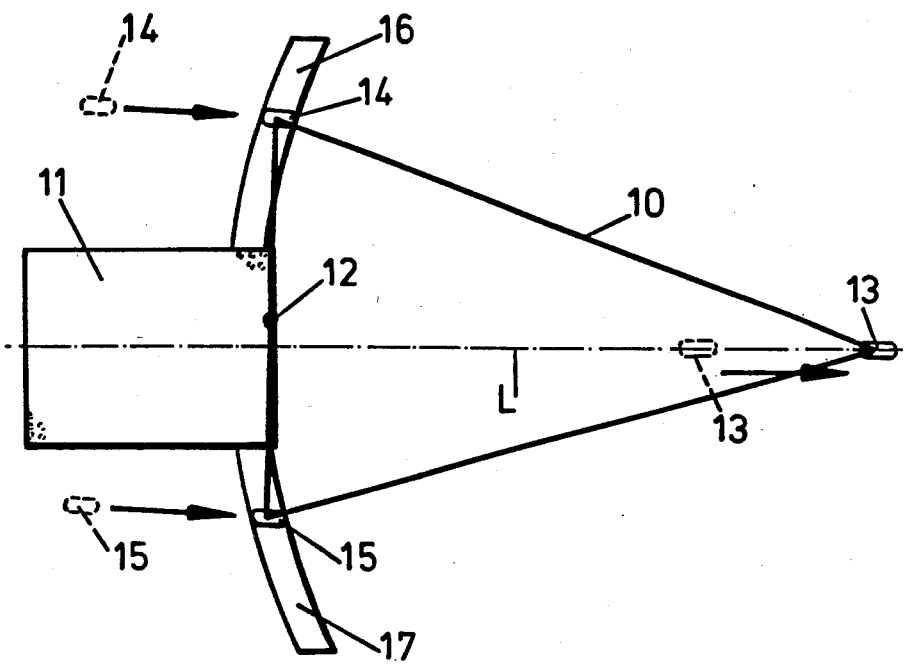
Figure 3:
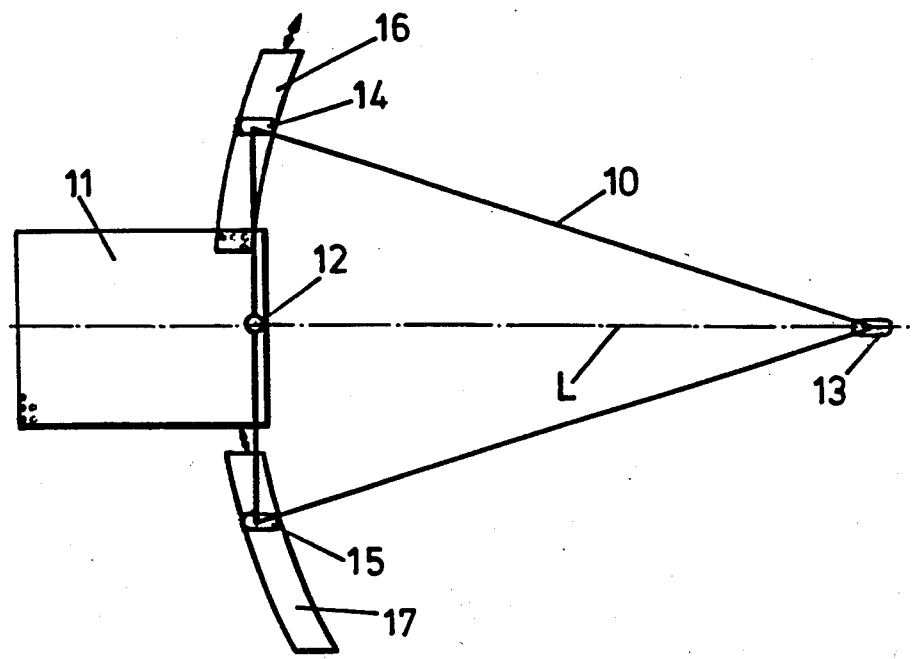

An embodiment of the invention will now be described, by way of example, with reference to the accompanying drawings, in which:

FIGS. 1 to 3 illustrate diagrammatically the sequential movement of a helicopter from a position in which it has landed on a landing grid to a position in which it is aligned into a position ready for movement from the grid.

Apparatus for centering a helicopter 10 on board a ship comprises a perforated landing grid 11 of known construction on which the helicopter 10 can land and extend its harpoon 12 vertically downwards into engagement with the perforations on the grid. In this way, the helicopter 10 is fixedly secured to the grid 11 but is able to be rotated about the axis of the harpoon 12. The helicopter 10 has a nose wheel 13 and two main wheels 14,15.

Positioned towards the forward end of the landing grid 11 and to each side thereof is a pair of arcuate beams 16, 17. An aircraft handling system includes three deck-mounted rails (not shown) extending between the landing area and a hangar, one of the rails carrying a nose wheel shuttle and the other two outer rails carrying main wheel-engaging shuttles. The curvature of each, beam 16, 17 is constituted by an arc of a circle having the nose wheel 13 as its center and radius of which is the same as that of a circle drawn through the center the main wheels of the helicopter and having the nose wheel 13 as its center. The arcuate beams 16, 17 are disposed at a height corresponding to the height of the landing grid 11 so that the main wheels 14,15 of the helicopter 10 can move from the landing grid 11 to the surface of the arcuate beams 16,17 without substantial hindrance. The beams 16, 17 are power driven so that they can be moved arcuately relative to the landing grid 11 and the rail-guided tractor system. Although two separate beams 16,17 are shown in the above-described embodiment, one for each main wheel 14 and 15, it will be appreciated that a single arcuate beam could be substituted for the two separate beams 16,17.

In operation of the above described apparatus and as illustrated in FIG. 1, a helicopter 10 lands on the landing grid 11 and engages its harpoon 12 in one of the perforations in order to lock the aircraft 10 to the landing grid 11. It will be appreciated that the aircraft can land anywhere on the landing grid with a heading which might typically be within ±20° from the ship's heading. The aircraft is restrained against unwanted movement such as sliding, toppling or slewing but is capable of rotating about the axis of the harpoon. The nose wheel 13 of the aircraft is then turned through 90° to the position shown in dotted lines in FIG. 1 and the aircraft is then rotated about the harpoon 12 until the nose wheel 13 is positioned on the line L of intended path of travel where it is located on a nose wheel shuttle (not shown) which is movable along its rail under the guidance of the latter. Before locating the nose wheel 13 on its shuttle, the nose wheel is again rotated through 90° so that its axis is normal to the line L.

As shown in FIG. 2, the harpoon 12 is disengaged and the nose wheel 13 is then pulled forwardly on line L from its position shown in dotted lines to the position shown in full lines. In so doing, the main wheels 14, 15 are moved from the position shown dotted to a position in which they are located on the arcuate beams 16, 17 respectively.

By lateral movement of the beams 16, 17 and restraining the nosewheel 13 against movement, the aircraft is moved to the position shown in FIG. 3 where the harpoon 12 is position over line L preferably so that the main wheels 14, 15 are substantially equidistant on either side of the line L. The harpoon is then reengaged with the landing grid 11 and the aircraft engines shut down. In the position of FIG. 3, nosewheel 13 and main wheels 14, 15 are accurately positioned for engagement with an aircraft handling system whereby the aircraft can be moved along the line L, which may be the centreline of a ship, into a hangar of the like. Alternatively, the aircraft can be reprovisioned when locked in an aligned position on the arcuate beams 16, 17.

Although the above-described invention is particularly suitable for helicopters, it will be appreciated that it is equally applicable to other types of aircraft.

I claim:

1. Apparatus for positioning an aircraft, said apparatus comprising an aircraft landing means (11) on which an aircraft can be engaged for rotation about a harpoon (12) of the aircraft characterised in that there is provided laterally adjustable aligning means comprising an arcuate member or members (16, 17) associated with the landing means (11), the curvature of said arcuate member or members (16, 17) being the same as that of a circle having nosewheel at its center and drawn through the centres of spaced main wheels (14, 15) of an aircraft and being adapted to receive the spaced main wheels (14, 15) of the aircraft on movement thereof from the landing means (11) and being movable laterally to position said main wheels (14,15) at a desired location on either side of an intended path (L) of travel of the aircraft.

2. Apparatus as claimed in claim 1, in which the upper surface of the aligning means (16,17) is in alignment with the upper surface of the landing means (11).

3. Apparatus as claimed in claim 1 or 2, in which the aligning means (16,17) is disposed relative to the landing means (11) and a rail-guided aircraft handling system whereby an aircraft can be moved from a first position on the landing means to a second position remote from said landing means.

4. A method of positioning an aircraft having a pair of spaced main wheels (14,15) comprising engaging an aircraft on a landing means (11) by means of a harpoon (12) or the like and rotating the nose of the aircraft onto a line (L) constituting the intended path of travel of the aircraft from the landing means (11) characterised in that after release of the harpoon or the like, the nose of the aircraft is moved away from the landing means (11) along the line (L) of intended path of travel to position the spaced main wheels (14,15) of the aircraft on laterally adjustable aligning means (16,17) associated with the landing means (11), and effecting lateral adjustment of said aligning means (16,17) to position the spaced main wheels (14,15) at a desired location on either side of said line (L) of intended path of travel.

5. A method as claimed in claim 4, in which said laterally adjustable aligning means comprises an arcuate member or members (16,17).

6. A method as claimed in claim 5, in which the curvature of said arcuate member or members (16,17) is the same as that of a circle having the nosewheel at its center and drawn through the centres of the spaced main wheels (14,15) of the aircraft.

7. A method as claimed in any of claim 4 to 6, in which the main wheels (14,15) when at said desired location are spaced substantially equidistantly on either side of the line (L) of intended path of travel.

* * * * *